Dec. 10, 1968    J. D. BECK    3,415,302
CAPTIVE FASTENER ASSEMBLY
Filed Oct. 4, 1967
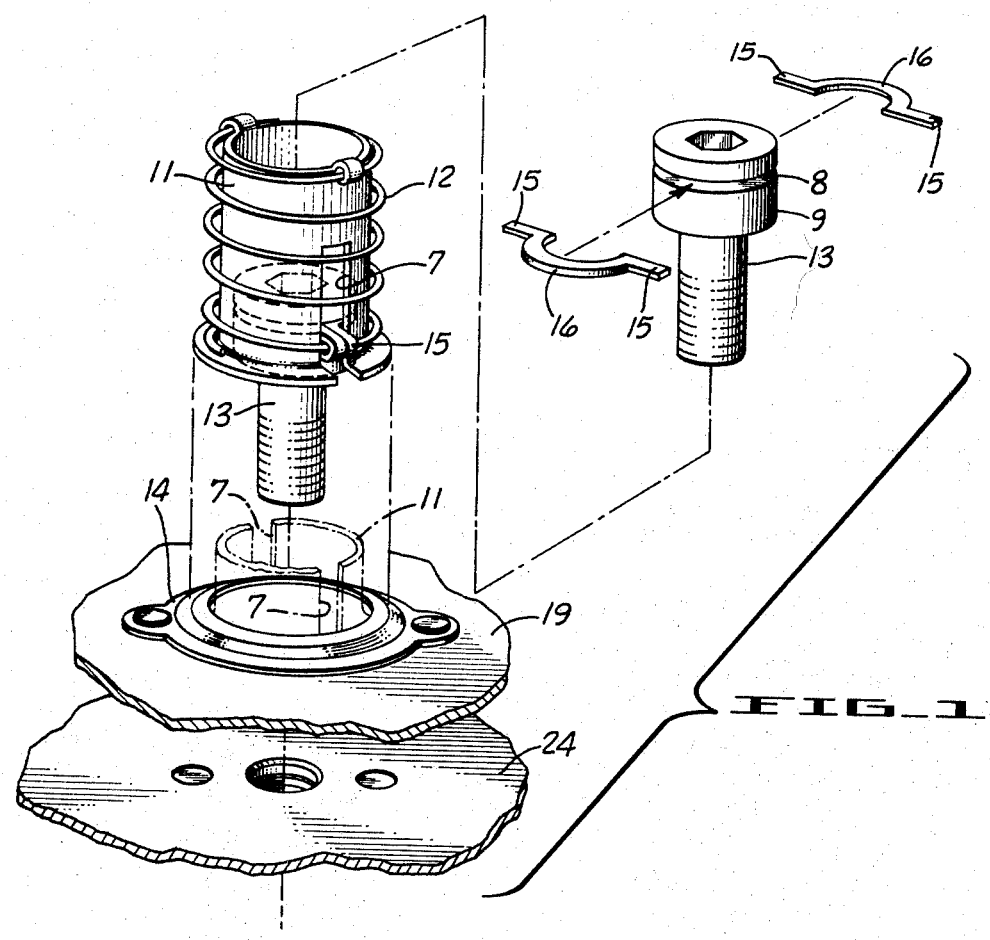
FIG_1
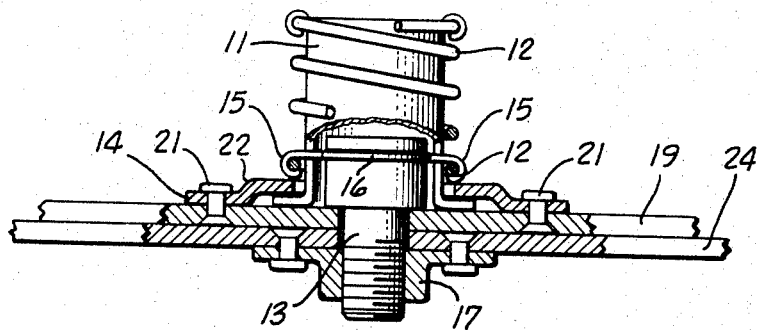
FIG_2
JOSIAH D. BECK
INVENTOR.
BY Neil J. Falley
ATTORNEY

United States Patent Office 3,415,302
Patented Dec. 10, 1968

3,415,302
CAPTIVE FASTENER ASSEMBLY
Josiah D. Beck, 2585 Oak Park Lane,
Campbell, Calif. 95008
Filed Oct. 4, 1967, Ser. No. 672,792
3 Claims. (Cl. 151—69)

ABSTRACT OF THE DISCLOSURE

A fastener device for holding adjacent workpieces is provided with a captivating floating receptacle which retains the fastener. Retention of the fastener is provided by a pair of split rings having tab ends which slide within slots cut in the wall of the captivating receptacle. A spring is provided to hold the fastener in its desired position when not in use.

Background of invention

This invention relates to fastening means and particularly to a lightweight, self-reacting, floating, rotary fastener that provides full allowable strengths of a bolt used in conjunction with the fastener.

A great many so-called captive fasteners are presently available on the commercial market. It is believed that most of the captive fasteners, in order to provide a quick fastening capability along with the captive feature, have sacrificed their full allowable strengths, including shear strength, tensile strength, bending and fatigue strengths. State of the art captive fasteners inherently induce bolt bending whenever shear loads are encountered, thereby causing premature failure of the fastener assembly. The bending is usually the result of inherent diametrical looseness within the captivating assembly.

It is the primary object of the present invention to provide an improved self-contained, self-retracting captive fastener which permits the bolt portion to develop full allowable strengths.

One feature of the present invention is to provide a "floating" capability which will reduce tolerance requirements and lower fabrication cost of the end product using the improved floating captive fastening device.

Another object of the present invention is the provision of a novel retention ring which improves operation of the fastener within the captivating receptacle.

The above object and feature and other objects and features of the present invention will become apparent to those skilled in the art of fastening devices upon a perusal of the following specifications and drawings of which:

FIGURE 1 is an exploded perspective view of a captive fastener embodying the principles of this invention; and FIGURE 2 is a front sectional view of the captive fastener.

Referring to the drawing, there is illustrated a captive fastening assembly comprising a rotary threaded fastener 13, for example a bolt or screw, having a cylindrical, grooved head 9. Fastener 13 may be of the self-locking type if so desired. Receptacle means 11 provides a housing and captivating assembly for fastener 13. The lower portion of the receptacle means 11 is provided with a pair of slots 7 which are located on opposite sides thereof. A lip 6 is provided on the extreme bottom of receptacle means 11.

Rotary threaded fastener 13 is held captive within receptacle means 11 by a pair of split rings 16 each having a tab 15 extending outwardly from an end. The inner edge of each of the split rings 16 is fitted into groove 8 of fastener head 9. Split rings 16 may be substituted for by an annular ring which is slotted and pressed into place over fastener head 9 into groove 8.

Fastener 13 is inserted into receptacle means 11 from the bottom adjacent lip 6 and tabs 15 of split rings 16 are fitted into slots 7. A spring 12 is secured to the top portion of receptacle means 11 by eyelets or other convenient means and secured at its other end to tabs 15 which also may be bent to form eyelets.

The entire assembly including fastener 13 which is inserted into receptacle means 11 is held into position on the mounting surface 19, which may be an inspection panel or other workpiece, by a holding ring or base 14, secured on mounting surface 19 by rivets 21. The inner portion of base 14 is provided with a raised shoulder 22 which fits over lip 6 of receptacle means 11. Raised shoulder 22 is of sufficient height and diameter to permit receptacle means 11 to "float" or move along the plane of mounting surface 19 a small amount. This "floating" action permits ease of installation of the fastener assembly on mounting surface by reducing the tolerance requirements in assembly. The entire assembly is provided for the sole purpose of fastening a pair of panels together and therefore a hole must be drilled into mounting surface 19 and its mating panel or substructure 23. It is understood that the "floating" action may not always be desirable in given applications and could be easily eliminated by providing a large lip 6 capable of being riveted to panel 19.

In its unfastened position, fastener 13 is retained in receptacle means 11 by the bias on spring 12. When it is desired to secure the two panels 19 and 23 together, fastener 13 is pushed down through the holes in the panels into the mating threaded portion of a plate nut 17 for example, which would be secured to substructure 23. It is understood that any other type of device or means for receiving the threaded end of fastener 13 may be used. Fastener 13 may then be tightened as desired by using readily available tools, depending on the configuration of head 9.

By providing a fastener as shown and described, with its head in contact with the mounting surface panel and its mating nut in contact with the faying surface of the mating panel, the fastener 13 may develop its full allowable shear strength. This characteristic is highly desirable because bolts are primarily shear fasteners. In all previous captive fasteners, whenever shear loads are encountered, bending of the shank of the fastener occurs, and the combined shear and bending stresses precipitate premature failure of the assembly. Since the fastener used in the present invention does not alter the bolt shank, persons utilizing it will be able to refer to existing handbooks and tables of bolt allowables for the required strength information, and consequently expensive test programs usually necessary to substantiate joint strength will be avoided.

It is to be understood in connection with this invention that various modifications can be made in the construction and arrangement of the captive fastener within the scope of the invention as defined in the appended claims.

I claim:
1. A captive fastener device comprising:
   a threaded fastener having a grooved head portion;
   a receptacle adapted to receive said threaded fastener therein, said receptacle comprising a substantially cylindrical member open at both ends and having longitudinally directed slots provided along the cylindrical wall at one end thereof;
   retention means adapted to be positioned in the grooves of the head portion of said threaded fasteners, said retention means including outwardly extending tabs; spring means;
   said threaded fastener and retention means adapted to be positioned within said receptacle such that the tabs of said retention means are slideably captured in the slots of said receptacle and means for securing said spring means at one end to said receptacle and at the other end to said tabs for moveably capturing said threaded fastener within said receptacle.

2. A captive fastener according to claim 1 wherein said receptacle includes an outwardly extending lip adjacent one end thereof and further including an annular holding ring, said annular holding ring having a raised shoulder portion adjacent its inner edge, means whereby said annular holding ring is adapted to fit over the cylindrical receptacle to secure said receptacle against a workpiece.

3. A captive fastener device according to claim 2 whereby the raised shoulder of said annular holding ring permits movement of said receptacle along the plane of said workpiece.

References Cited
UNITED STATES PATENTS

| | | | |
|---|---|---|---|
| 2,831,520 | 4/1958 | Clarke | 151—69 |
| 2,992,685 | 7/1961 | Madsen | 151—69 |

FOREIGN PATENTS

| | | |
|---|---|---|
| 727,499 | 11/1942 | Germany. |

MARION PARSONS, JR., *Primary Examiner.*